United States Patent [19]
Walker

[11] Patent Number: 5,730,083
[45] Date of Patent: Mar. 24, 1998

[54] PEST BARRICADED ANIMAL FEEDER

[76] Inventor: Robert T. Walker, 13027 Blairwood Dr., Studio City, Calif. 91604

[21] Appl. No.: 758,907

[22] Filed: Dec. 2, 1996

Related U.S. Application Data

[63] Continuation-in-part of Ser. No. 384,745, Feb. 7, 1995, Pat. No. 5,619,952.

[51] Int. Cl.⁶ ........................................... A01K 5/00
[52] U.S. Cl. ................................................ 119/61
[58] Field of Search .......................... 119/61, 63, 515, 119/174

[56] References Cited

U.S. PATENT DOCUMENTS

| | | | |
|---|---|---|---|
| 3,995,595 | 12/1976 | Williams | 119/61 |
| 4,803,954 | 2/1989 | Welch et al. | 119/61 |
| 4,953,506 | 9/1990 | Sanders | 119/61 |
| 5,253,609 | 10/1993 | Partelow et al. | 119/61 |
| 5,619,952 | 4/1997 | Walker | 119/61 |

*Primary Examiner*—Thomas Price
*Attorney, Agent, or Firm*—Robert J. Schaap

[57] ABSTRACT

An improved animal feeder in the nature of a dish or bowl for feeding pets and which includes a pest barrier to preclude crawling pests from infestation of the food or liquid to be ingested by the animal. In one embodiment, the invention includes the use of a moat with liquid as a barrier to preclude traversal of crawling insects and, in another embodiment, the invention includes a cartridge or pad containing an insect barricade. In one embodiment, the barricade may adopt the form of a very tacky composition, which effectively entraps insects which come into contact with the composition. In another embodiment, the barricade may adopt the form of a insect repellant. Preferably, the insect repellant is incorporated directly into the entrapping composition to reduce evaporation thereof, and which also makes the device more effective. The animal feeder essentially includes an upper bowl with a lower level receptacle containing either the moat of liquid or the insect repellant.

13 Claims, 3 Drawing Sheets

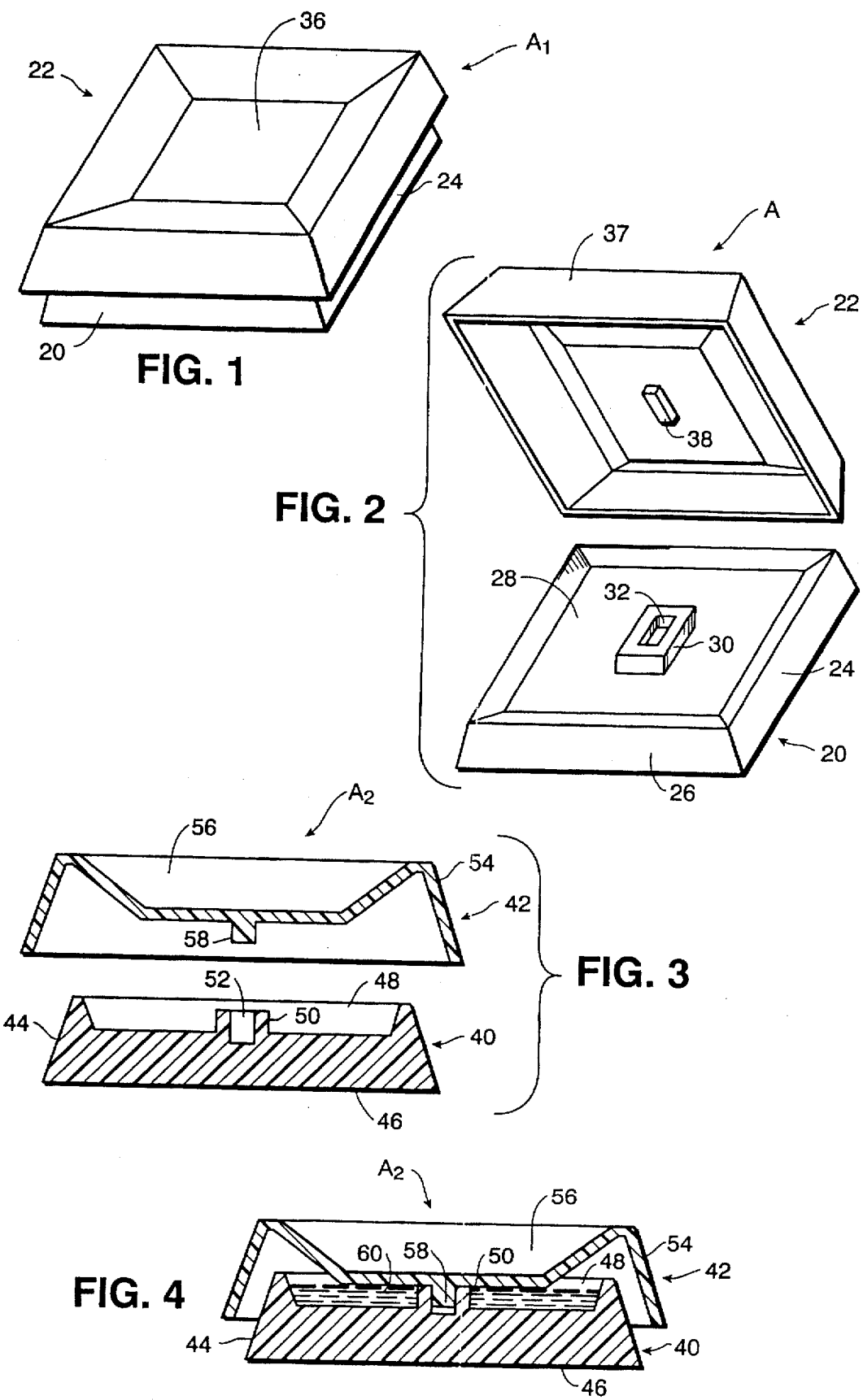

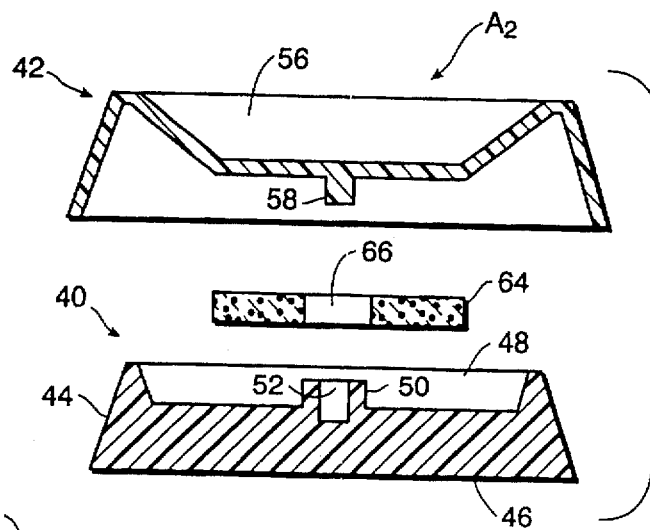
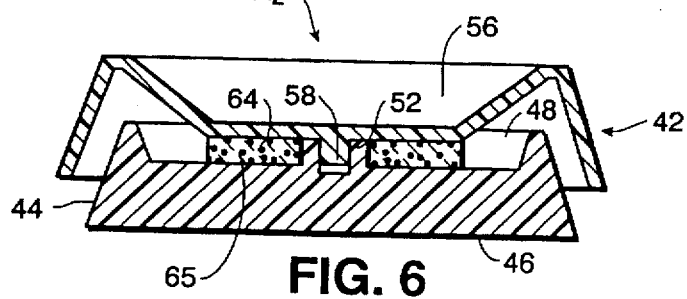
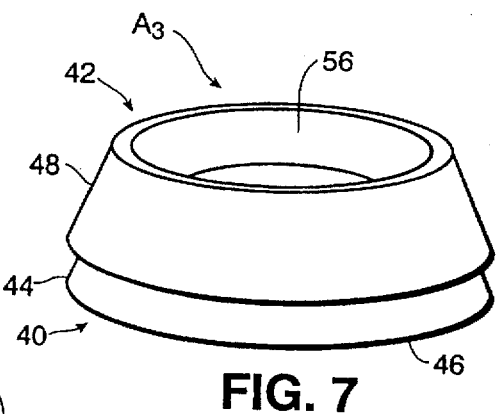
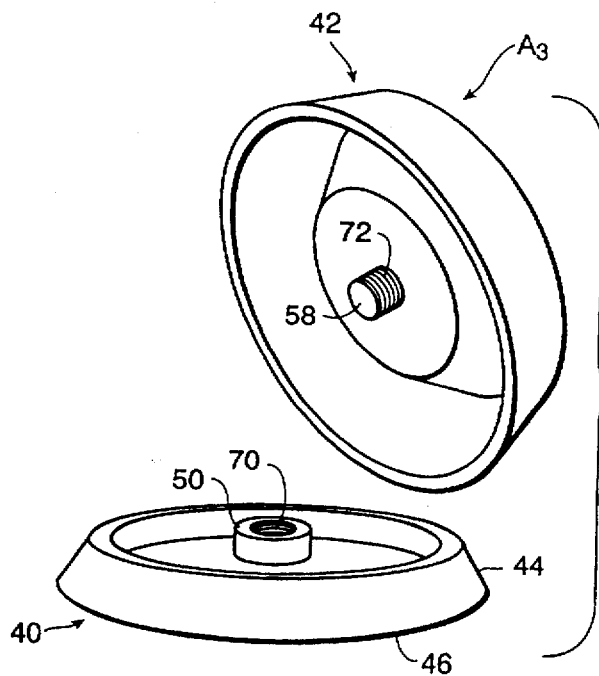

5,730,083

PEST BARRICADED ANIMAL FEEDER

RELATED APPLICATION

The application is a continuation-in-part of my U.S. patent application Ser. No. 08/384,745, filed Feb. 7, 1995, Pest Barricaded Animal Feeder now U.S. Pat. No. 5,619,952.

BACKGROUND OF THE INVENTION

1. Field of the Invention

This invention relates in general to certain new and useful improvements in animal feeders and more particularly, to animal feeders of the type which include a barrier to prevent crawling insects from congregating at the food or liquid intended for consumption by an animal.

2. Brief Description of Related Art

There are numerous commercially available animal feeders for containing solid food or liquid to be ingested by an animal and particularly, a pet animal. These feeders usually exist in the form of a bowl or a dish having a cavity to contain the dry food or liquid and they exist in numerous sizes and shapes.

In absence of some positive pest barricade construction, these animal feeders will attract various pests such as ants, roaches and other crawling insects. Indeed, after a short period of time, if the animal feeders contain any food or liquid, other than water and if left unattended, they will attract a sufficient amount of pests to the point where the food is relatively inedible.

In order to eliminate or reduce pest infestation problems, various types of animal feeders have been proposed in the prior art which use a moat arrangement surrounding the food dish portion of the animal feeder. This moat usually contains a liquid such as water which serves as a barrier to preclude access by the insects or other crawling pests to an inner food dish.

A number of animal feeders which use a moat arrangement have been taught in the prior art and date back as far as 1889, as set forth in U.S. Pat. No. 395,490. Other animal feeders which utilize some type of moat arrangement are taught in U.S. Pat. No. 4,896,627 dated Jan. 30, 1990; U.S. Pat. No. 5,117,778 dated Jun. 2, 1992; U.S. Pat. No. 5,277, 149 dated Jan. 11, 1994; U.S. Pat. No. 4,357,905 dated Nov. 9, 1982; U.S. Pat. No. 2,543,465 dated Feb. 27, 1951; U.S. Pat. No. 2,548,301 dated Feb. 5, 1952; U.S. Pat. No. 4,007,711 dated Feb. 15, 1977; and U.S. Pat. No. 2,191,811 dated Feb. 27, 1940.

Each of the animal feeders taught in the aforesaid U.S. patents are all similar in construction and include a moat of water or other liquid surrounding a central food containing dish. While these devices are effective for repelling crawling pest activity, they do present several drawbacks. If the water or other liquid in the moat portion of the feeder should evaporate, then the crawling pest barrier is eliminated. Accordingly, a constant vigil must be maintained to ensure that there is always water or other liquid present in the reservoir.

In addition to the problems of evaporation, the pet itself will often drink the water in the moat, unconscious of the fact that the moat is designed to repel crawling insect activity. Consequently, the same problems of monitoring the animal dish are required. Further, after a short period of time, dirt and other foreign matter becomes entrained in the liquid portion of the moat thereby soiling the feeder. As a result, constant cleaning is often required.

In the prior art, there have been attempts to use a pest barricading composition of the type which causes an insect to become entrapped directly in the composition which an insect walks on or otherwise comes in contact with the composition. In this way, the insect will quickly perish. Other forms of barricades include insect repellents, which are designed to be offensive to an insect, causing its disbursal from an area. There is no prior art known which effectively incorporates the insect repellant directly into a barricading composition.

There are other types of animal feeders which have been taught in the prior art and include U.S. Pat. No. 2,366,584 dated Jan. 2, 1945; U.S. Design Pat. No. Des 105,450 date Jul. 27, 1937; U.S. Pat. No. 747,677 dated Dec. 22, 1903; and U.S. Pat. No. 1,896,096 dated Feb. 7, 1933. However, these other animal feeder devices do not overcome the problems of pest infestation.

OBJECTS OF THE INVENTION

The present invention seeks to overcome the above-described problems inherent in several prior art devices in accordance with at least the following objects:

It is, therefore, one of the primary objects of the present invention to provide a pest barricaded animal feeder which is comprised of a first bowl designed for containment of dry food or liquid, for an animal, and a second bowl precluding an access to the first bowl and containing a barrier which precludes infestation by crawling pests.

It is another object of the present invention to provide a pest barricaded animal feeder of the type stated which is highly effective for use in repelling pests by the use of a liquid moat or a pest repellent composition.

It is a further object of the present invention to provide a pest barricaded animal feeder of the type stated in which one bowl containing a liquid or dry food may be disposed above another bowl containing a member which precludes pest infestation.

It is an additional object of the present invention to provide a pest barricaded animal feeder of the type stated which can be constructed in a variety of sizes and shapes and which is highly effective for use with most domesticated pet animals.

It is also an object of the present invention to provide an animal feeder of the type stated in which a liner can be used in a food or liquid receiving bowl in order to reduce the need for cleaning and facilitate cleaning.

It is yet another object of the present invention to provide an animal feeder of the type stated which employs an insert capable of being disposed in an animal feeding bowl and which is readily removable for discarding and replacement with a new insert.

It is still a further object of the present invention to provide an animal feeder which contains an insect barricade in the form of an entrapping composition which incorporates directly into the entrapping composition an insect repellant.

It is also a salient object of the present invention to provide a method for introducing feed or liquid into a animal feeder while avoiding pest infestation which may become associated therewith.

With the above and other objects in view, my invention resides in the novel features of form, construction, arrangement and combination of parts presently described and pointed out in the claims.

SUMMARY OF THE INVENTION

The present invention relates to an animal feeder which is uniquely designed to avoid pest infestation and particularly crawling pest infestation such as crawling insects and the like.

The animal feeder of the invention in one embodiment comprises a food or liquid bowl effectively surrounded or otherwise barricaded by a bowl containing a pest repellent or a liquid moat. In this way, the barricading level effectively surrounds the feed or liquid bowl containing a food or liquid which would otherwise be attractive to pests. The animal feeder is preferably constructed of a two-tiered system wherein the lower tier comprises a first bowl including a pest barricading mechanism, and the second bowl on the upper tier contains the food or liquid which is to be consumed by the pet.

The prior art has clearly recognized the use of a pest barricaded animal feeder by using a bowl containing food or liquid to be consumed by the animal and surrounded by some type of moat containing a liquid to preclude access by crawling pests. The present invention is uniquely designed in that in one aspect, the invention can use a liquid barrier such as water which precludes traversal by crawling insects which would otherwise attempt to reach the food or liquid. In another embodiment of the invention, a pest barricading composition is actually used.

The pest barricading composition may actually adopt the form of a pest repellant, that is, a composition which is offensive to and thereby cause a dispersal of the crawling pests. Otherwise, the pest repellant may adopt the form of a pesticide, and preferably a quick acting pesticide, which literally kills the insects by entrainment through the feet and legs of the insect. Otherwise, the pest barricading composition may adopt the form of a viscous and sticky substance which literally entraps the crawling insect or pest. In addition, combinations of the foregoing may be used.

The pest barricading composition may adopt a variety of forms and may include a pad or like member containing a pest repellant or pesticide. Thus, the pad, or other member, may include sufficient interstices in which to hold a repellant or pesticidal composition. Any member which has a reservoir or operates in the manner of containing a reservoir as, for example, a porous member, would be effective for this purpose. In like manner, the pest barricading composition could adopt the form of a relatively non-viscous and quite sticky or tacky substance disposed on a tray and which causes entrapment of the insects when they attempt to traverse the tray.

In still another embodiment of the invention, the repellant or otherwise a pesticidal composition, could be incorporated directly into the viscous entrapping composition. Generally, in the prior art, some repellents are liquid in form, and even though they may have a moderate viscosity, they are still nevertheless volatile and capable of being evaporated. However, many of the effective repellants are relatively solid materials, as for example, cayenne, garlic or the like. These materials are effective in repelling many forms of insects. However, they can become quite an irritant to many domesticated animals and therefore care must be taken when using such repellant material.

The entrapping composition, on the other hand, is typically a viscous gum-like substance, which is sticky, and has an extremely low rate of evaporation. In accordance with the present invention, a repellant or otherwise a pesticide, can be incorporated in the entrapping composition. The repellant composition is typically incorporated into the entrapping composition during the formation of the entrapping composition. In this way, there is a homogenous mixture of the repellant in the entrapping composition and the repellant is incorporated into the entrapping composition. Otherwise, due to the relatively thick and generally viscous nature of the entrapping composition of repellant would otherwise sit on the top of the entrapping composition if it were poured on to the composition. If an insect should land on the entrapping composition, it would perish by virtue of the insecticide. Conversely, the repellant would cause a repelling of the insect. However, when incorporated in the entrapping composition, the repellant or insecticide would not evaporate to nearly the same degree that it would otherwise evaporate when left in a moat or a dish, or for that matter, even a saturated pad. Thus, the present invention is highly effective in literally incorporating the repellant or pesticide directly in the jelly-like entrapping composition.

The animal feeder can be constructed in a manner so that the pest barricading composition actually precludes crawling to the food bowl. However, in a more preferred embodiment, the pest barricading composition is located in a lower tier with the food or beverage containing bowl located in an upper tier. In this way, the crawling pest would necessarily have to cross the bowl or cavity of the lower tier in order to reach the upper tier, but which would be barricaded by either a liquid moat or the pest barricading composition.

The insecticide or otherwise, the repellant should be at least partially isolated with respect to the animal which would use the feeding dish. Otherwise, the repellant particularly, could become an irritant to the animal and interfere with the feeding of the animal. Thus, in a two-tier arrangement of an animal feeder such as an upper dish disposable over the lower dish, the upper dish should at least have an enlarged skirt so as to partially encircle and block the smell of the pest repellant.

A pad, disk or like device containing a reservoir, or other means forming a reservoir, as aforesaid, is effective to retain the pest repellant composition. When the composition or pesticide has evaporated or has dried up, it is easy and convenient to add a new pad with a new charge of the pest repellant or pesticide. For this purpose, the pest repellant or pesticide may adopt the form of a wax-like composition but which nevertheless has a very sticky or tacky upper surface. In a more preferred embodiment, the member which holds the pest repellent or pesticide can easily be replaced. Thus, the consumer would purchase a large assortment of these pads or like members and replace them periodically, as required.

The pest barricaded animal feeder of the invention is effective in that the same feeder can be used with either a liquid moat or a pest repellent composition. In either case, no modification of the feeder is required.

In a more preferred embodiment, the upper bowl is adapted for removable attachment to the lower bowl. For this purpose, the upper bowl may have a downwardly projecting post on its underside adapted for attachment to an upwardly struck projecting post on the lower bowl. Thus, the two tiers of bowls are easily separable from one another for purposes of cleaning and/or storage.

The upper bowl preferably extends beyond the periphery of the lower bowl, so that the water or other liquid contained in the lower bowl and functioning as a barrier, will not be consumed by the animal as such. Moreover, since the lower bowl is effectively covered by the upper bowl, evaporation is substantially reduced. In addition, when the animal feeder is used with a pest repellent composition, a pad in the form of a disk having a central aperture can be disposed about the post on the lower bowl. Moreover, this pad can be readily removed from time to time for adding an additional pest repellent or pesticidal composition to the pad, or by merely replacing the pad.

The present invention also provides a liner which may be used with the animal feeder of the invention. This liner is sized and shaped to fit within the food receiving bowl. Thus, the liner will have a continuous side wall and a bottom wall adapted to fit within and effectively engage a peripheral side wall and bottom wall of the food receiving bowl. Further, the liner may be provided with an angularly extending rim and a depending flange, with the latter to engage the exterior surface of the food bowl. By using a removable liner, the food receiving bowl is not frequently soiled and requires less cleaning than would otherwise be required.

Various embodiments of the animal feeders of the present invention are both illustrated in the accompanied drawings and described in detail in the following detailed description of this invention. However, it should be understood that the following detailed description and the accompanying drawings are only set forth for purposes of illustrating the general principles of the invention. Therefore, it is to be understood that these drawings and the following detailed description are not to be taken in a limiting sense.

BRIEF DESCRIPTION OF THE DRAWINGS

Figure 9:
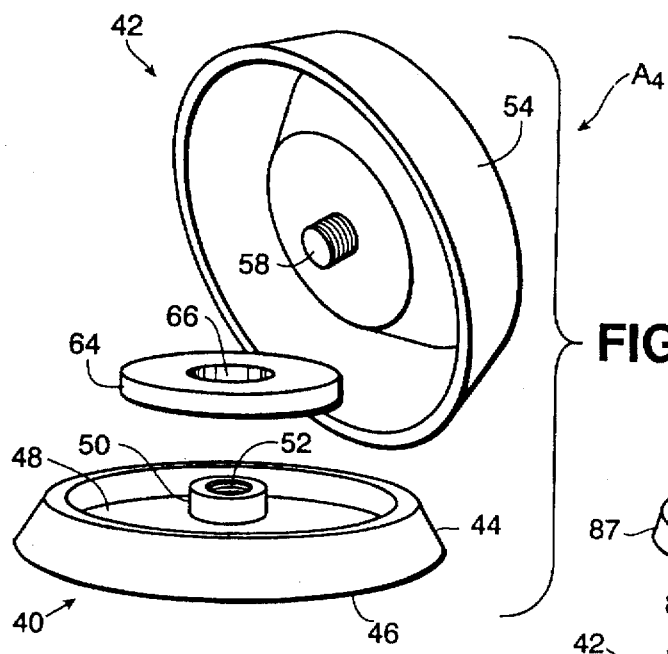
Figure 10:
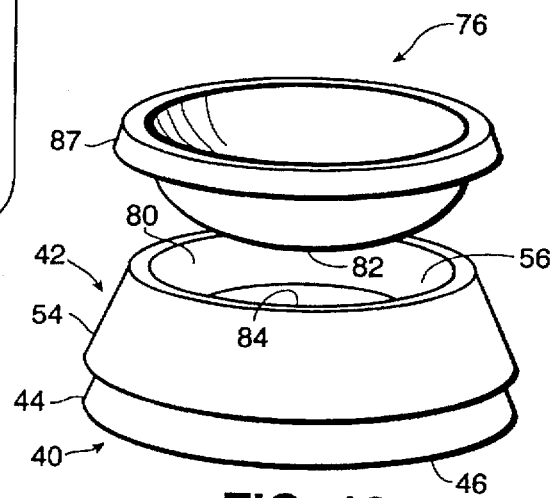
Figure 11:
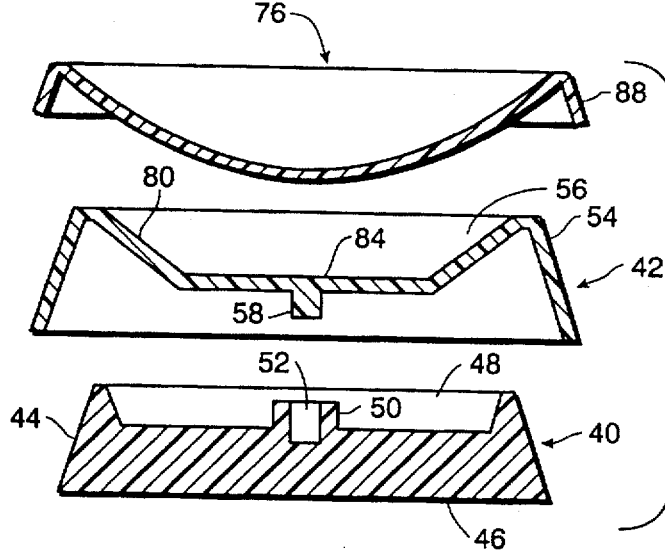
Figure 12:
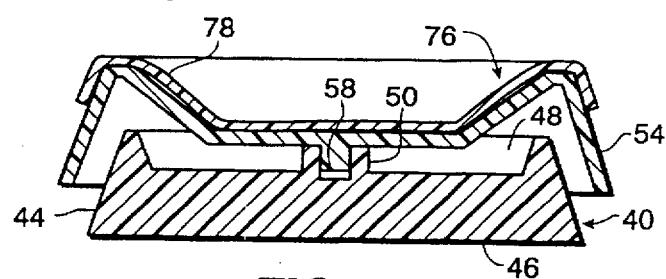

Having thus described the invention in general terms, reference will now be made to the accompanying drawings in which:

FIG. 1 is a perspective view of a pest barricaded animal feeder constructed in accordance with and embodying the present invention;

FIG. 2 is an exploded perspective view showing portions of the components of the animal feeder of FIG. 1;

FIG. 3 is an exploded vertical sectional view of a modified form of animal feeder constructed in accordance with and embodying the present invention;

FIG. 4 is a vertical sectional view showing the animal feeder of FIG. 3 with the components in an assembled position and using a liquid moat as a pest barricade;

FIG. 5 is an exploded vertical sectional view, similar to FIG. 3, and showing the use of a pest repellent pad in accordance with the present invention;

FIG. 6 is a vertical sectional view, similar to FIG. 4, and showing the use of the pest repellent pad in the animal feeder and when the components are in an assembled condition;

FIG. 7 is a perspective view of another modified form of animal feeder constructed in accordance with and embodying the present invention;

FIG. 8 is an exploded perspective view showing the components of an animal feeder when the feeder is adapted for use with a liquid moat;

FIG. 9 is an exploded perspective view, similar to FIG. 8, and showing the animal feeder of FIGS. 7 and 8 adapted for use with a pest repellent composition;

FIG. 10 is an exploded perspective view showing the use of a disposable liner in the animal feeder of the invention;

FIG. 11 is an exploded vertical sectional view showing one embodiment of an animal feeder of the invention used with a disposable liner; and FIG. 12 is a vertical sectional view somewhat similar to FIG. 11 and showing the components of the animal feeder with a liner in the assembled condition.

DETAILED DESCRIPTION OF PREFERRED EMBODIMENTS

Referring now in more detail and by reference characters to the drawings, $A_1$ designates one embodiment of an animal feeder which is constructed in accordance with the present invention. The animal feeder $A_1$ comprises a lower bowl 20 and a food or liquid beverage receiving bowl 22 adapted for disposition above the lower bowl 20.

The lower bowl 22 is in the form of a base having a peripherally extending side wall 24 and a bottom wall 26, with the latter designed for disposition on a floor or other supporting surface. A recess 28 is formed in the lower bowl 20 in order to receive a pest barricade of the type hereinafter described. For this purpose, an upstanding post 30 may be integrally formed with or otherwise secured to the upper surface of the recess 28, as best shown in FIG. 2 of the drawings. Moreover, the upstanding projection 30 is provided with an elongate slot 32.

The upper bowl 22 is similarly provided with a peripherally extending side wall 34 and has an upper food or beverage receiving cavity 36 on its upper surface, as best shown in FIGS. 1 and 2. Moreover, on its underside, the food receiving bowl 22 is provided with a downwardly extending locking projection 38 with a latter designed to fit within the elongate slot 32. In this way, the upper bowl 22 can be retentively held on the lower bowl 20, as shown in FIG. 1.

In the embodiment of the invention, as illustrated in FIGS. 1 and 2, the animal feeder $A_1$ is square or rectangular in shape. It is also possible to provide an animal feeder $A_2$ of the type illustrated in FIGS. 3–6 of the drawings. In this embodiment $A_2$ and in the following embodiments, like components will be used with common reference numbers. The animal feeder $A_2$ is also provided with a circularly shaped lower bowl 40, and a circularly shaped upper bowl 42. The lower bowl 40 is provided with a circular peripherally extending wall 44 and a lower wall 46, with the latter being designed for disposition on a floor or other supporting surface. The lower bowl 40 is further provided with a barricade cavity 48 and an upstanding circularly shaped projection 50 having a circular recess 52.

The upper bowl 42 is similarly provided with a circularly shaped side wall 54 and an interior food or beverage receiving cavity 56. On its lower surface, the upper bowl 42 is provided with a downwardly extending circular projection 58 sized to fit snugly within the circular recess 52. In this way, the upper bowl 42 and the lower bowl 40 can be secured together, much in the manner as illustrated in FIGS. 3 and 4 of the drawings.

The pest barricade used in the animal feeder $A_2$ of FIGS. 3 and 4 constitutes a water moat 60. By examination of FIG. 2, it can be seen that the skirt or peripheral side wall 54 is spaced from the peripheral side wall 44 of the lower bowl 40. Thus, in order to reach the food or beverage which might be disposed in the food or beverage receiving compartment 56, the crawling insect would necessarily have to traverse the moat of water 60. Moreover, and by further reference to FIG. 4, it can be seen that the upper bowl effectively completely covers the moat 60 so that evaporation is substantially reduced. Moreover, and due to the construction of the animal feeder $A_2$, the pet animal has little or no opportunity to consume the water moat 60.

FIGS. 5 and 6 illustrate the use of the animal feeder $A_2$ with a pest repellent disk 64 containing a pest repellent or pesticide. In this case, the same animal feeder could be used either with the moat 60 or with the disk 64, as shown in FIGS. 5 and 6. The disk 64 is circularly shaped and is provided with a central opening 66 so as to be loosely disposed over the upstanding projection 50, as best shown in FIG. 6.

Any effective pesticidal composition or pest repellent composition could be incorporated in the blend of the entrapping composition with the repellant thoroughly and homogeneously mixed therein. This blend can then be incorporated in the disk 60, as previously described. Moreover, the disk 64 is formed of a porous material so that upon depletion of this pesticide or pest repellent composition, the disk 64 may be replaced. Also as previously indicated, it is possible to supply fully charged disks which are sealed in plastic envelopes and which can be opened and used by the consumer at will.

FIGS. 7, 8 and 9 illustrate a slightly modified form of animal feeder $A_3$ and which is similar to the animal feeder $A_2$. The major difference between the animal feeder $A_3$ and the animal feeder $A_2$ is that the upstanding circular boss 50 is provided with an internally threaded section 70. Moreover, the downwardly extending projection 58 is provided with an externally threaded section 72. In this way, the upper bowl can be threadedly secured to the lower bowl. This type of construction will eliminate a large dog or other animal from separating the two bowls forming part of the animal feeder. However, a bayonet type attachment may be used to connect the two bowls.

As indicated previously, the repellant or otherwise the pesticide, may be literally mixed directly into the entrapping composition, such as the so-called "Tanglefoot" composition during the formation thereof. In this way, and as indicated, the dispersion rate of the repellant or pesticide by virtue of wind or the like is substantially reduced if not eliminated. Moreover, by incorporating the repellant directly into the entrapping composition, the repellant does not become diluted in the event of rain, or otherwise, it does not collect a foreign substance which reduces its repelling activity. The repellant is generally inert with respect to the entrapping composition, but yet is capable of being held within the entrapping composition.

In all cases, it can be observed that the upper bowl completely extends beyond or at least to the periphery of the lower bowl. In this way, any fumes from the lower bowl are at least partially precluded from reaching the nostrils of the pet such as the dog or cat. The repellant which is generally a solid material as indicated, would otherwise become an irritant to a dog or cat and actually preclude the dog or cat from attempting to consume food in the food receiving bowl.

FIGS. 10-12 illustrate an embodiment of the invention utilizing an animal feeder $A_4$ which is substantially similar in construction to the animal feeder $A_2$ of FIGS. 3-6 of the drawings. In this embodiment of the invention, a removable liner 76 is provided for disposition in the open food or beverage receiving cavity 56. The liner 76 is provided with a frusto-conical side wall 78 which fits within a frusto-conical side wall 80 of the animal feeder and which defines the food or beverage cavity 56. Moreover, the liner 76 has a bottom wall 82 which effectively conforms to the bottom wall 84 in the food or beverage receiving cavity 56.

The liner 76 is also provided with a depending cylindrical skirt 88 and which is located and sized to extend over a portion of the cylindrical side wall 54 of the upper bowl 42, as best shown in FIGS. 11 and 12 of the drawings. In this way, the liner is retentively held on the animal feeder. Other means for holding the liner directly on the animal feeder could also be provided. Thus, for example, adhesive sections on either the animal feeder or the liner, or both, could be employed to retentively, but nevertheless, releasably hold the liner in place. Some of the other facets of this liner are more fully described and claimed in my co-pending U.S. patent application Ser. No. 08/354,428, filed Dec. 12, 1994.

The liner 76 is preferably formed of a thin plastic sheet material and which may be formed or molded. Moreover, it can be formed in a variety of different forming operations, such as thermoforming, injection molding and the like. The liner itself may also be formed of a more durable material and constitute a reusable liner or otherwise, it may be provided in packages so as to be disposable. The use of the liner has been found to be highly effective in that it facilitates cleaning, when required.

Thus, there has been illustrated and described a unique and novel animal feeder having the capability of using differing types of pest barricades and one which is also capable of receiving and using a food or beverage receiving liner. The animal feeder of the invention thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to have been covered by this invention.

Having thus described the invention, what I desire to claim and secure by letters patent is:

1. An animal feeder having a barrier means to preclude infestation by crawling insects of a food or beverage to be consumed by an animal:
   a) a food or beverage receiving bowl adapted to receive a food or beverage to be consumed by an animal; and
   b) a replaceable cartridge-like insect barrier having an insect entrapping composition to form an insect barricade to preclude insect transversal to the bowl, and which insect barricade comprises an insect repellent in the entrapping composition and where the entrapping composition causes an insect to be permanently entrapped in the composition, said cartridge-like barrier being replaceable with a like barrier when the repellant and/or entrapping composition loses its effectiveness, said insect barrier being located so that an insect must cross the barrier to reach the food or beverage receiving bowl.

2. The animal feeder of claim 1 further characterized in that the entrapping composition comprises a highly viscous wax-like substance having a tacky surface.

3. The animal feeder of claim 1 further characterized in that the food or beverage receiving bowl is an upper bowl and that the said insect barrier is located in a second bowl below the upper bowl.

4. The animal feeder of claim 3 further characterized in that said bowls are rectangularly shaped.

5. The animal feeder of claim 3 further characterized in that said bowls are circularly shaped.

6. The animal feeder of claim 3 further characterized in that a downwardly extending projection is located on said food or beverage receiving bowl, and that an upstanding recess containing section is located on the bowl having the insect barrier receptacle releasably connecting the two bowls together.

7. The animal feeder of claim 6 further characterized in that said upstanding recess containing section and said downwardly extending projection are adapted for threaded engagement with one another.

8. The animal feeder of claim 7 further characterized in that said repellant is impregnated in the composition such that the composition holds the repellant.

9. The animal feeder of claim 1 further characterized in that a bowl is adapted to be disposed in said food or beverage receiving bowl for purpose of receiving the food or beverage and which thereby reduces need for cleansing and facilitates cleansing of the bowl, said liner being formed of a material such that it is essentially reasonably capable of conforming to the size and shape of the bowl.

10. An improvement in an animal feeder with a barrier means to preclude infestation by crawling insects of a food or beverage to be consumed by an animal and which animal feeder comprises a food or beverage receiving bowl adapted to receive a food or beverage to be consumed by an animal, said improvement comprising an insect barrier located with respect to said food or beverage receiving bowl such that a crawling insect must transverse the barrier to reach the bowl having the food or beverage, said insect barrier comprising an insect entrapping composition which causes the insect to be permanently entrapped in the composition, and an insect repellant impregnated in the composition such that the composition holds the repellant.

11. The improvement in the animal feeder of claim 10 further characterized in that the entrapping composition comprises a highly viscous wax-like substance having a tacky surface thereon.

12. The improvement in the animal feeder of claim 10 further characterized in that the food or beverage receiving bowl is an upper bowl and that said insect barrier is located in a second bowl below the upper bowl.

13. The improvement in the animal feeder of claim 10 further characterized in that a liner is adapted to be disposed in said food or beverage receiving bowl for purposes of receiving the food or beverage and which thereby reduces need for cleansing and facilitates cleansing of the bowl, said liner being formed of a material such that it is essentially reasonably capable of conforming to the size and shape of the bowl.

* * * * *